April 28, 1970     J. HOCHSTRASSER ET AL     3,508,548
TAMPON
Original Filed Nov. 29, 1965     2 Sheets-Sheet 1

INVENTORS
JOSEF HOCHSTRASSER
& BERND MESSING

By:
ATTORNEYS

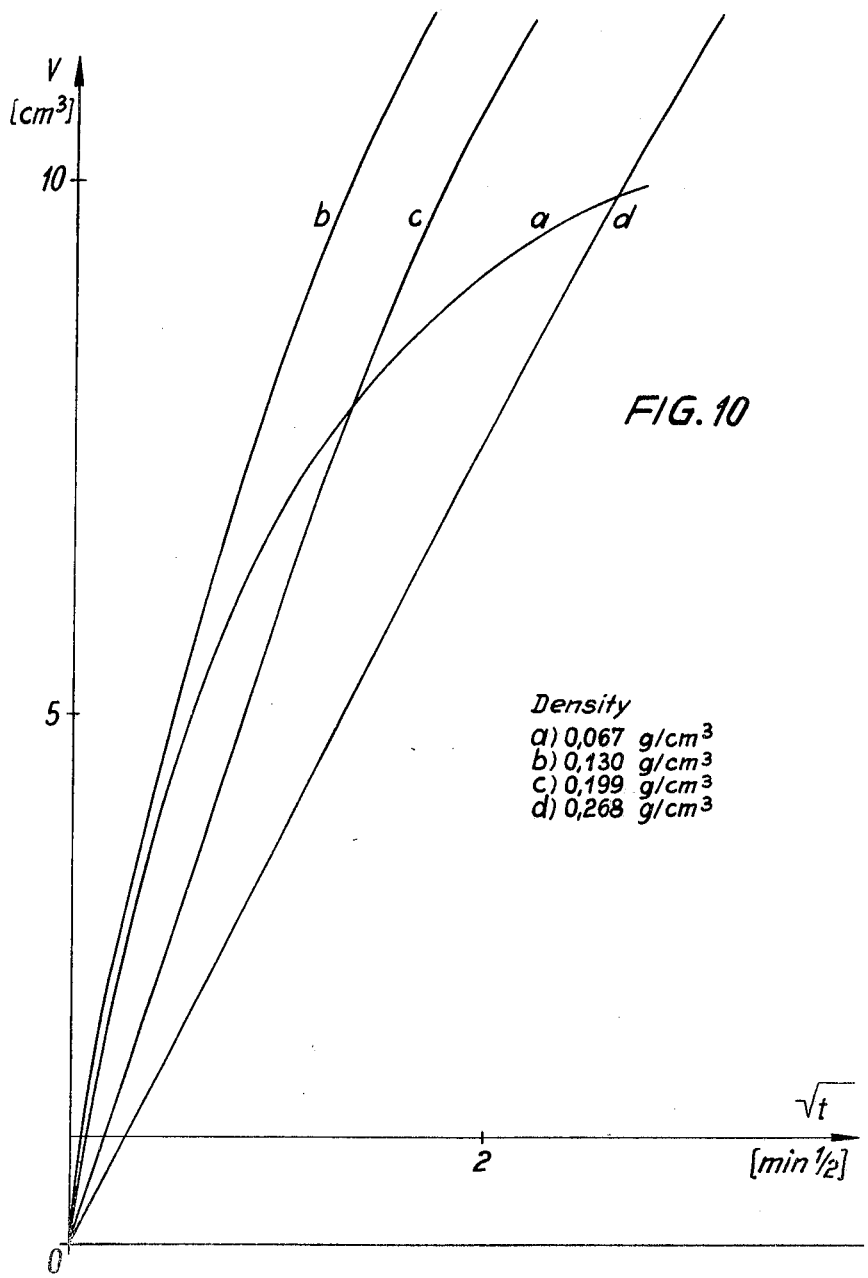

United States Patent Office 3,508,548
Patented Apr. 28, 1970

3,508,548
TAMPON
Josef Hochstrasser, Dusseldorf, and Bernd Messing, Wuppertal-Barmen, Germany, assignors to Dr. Carl Hahn KG, Dusseldorf, Germany
Continuation of application Ser. No. 510,218, Nov. 29, 1965. This application Oct. 21, 1968, Ser. No. 769,440
Claims priority, application Netherlands, Dec. 2, 1964, 6414000
Int. Cl. A61f *13/20*
U.S. Cl. 128—285                                        31 Claims

ABSTRACT OF THE DISCLOSURE

A tampon comprising a substantially cylindrical body of randomly disposed fibers, which tampon has a maximum specific absorption capacity at a specific volume of at least about 12 cubic centimeters per gram, and which tampon has a specific wet length of 0.5 to 1.7 centimeters per gram of dry tampon material when such tampon is permitted to expand in a liquid medium in a shallow dish, which tampon contains zones of greater and lesser material concentration distributed over at least the width thereof.

---

Figure 1:

The invention relates to catamenial tampons and has the objects of improving such devices in respect of the capacity for liquid absorption, the rate of liquid absorption, liquid retentivity under external variations of physical pressure, the control both of the radial expansion forces acting on the tampon and the final dimensions assumed by the tampon due to the absorption of liquid when in use, furthermore, of improving the uniformity of desirable characteristics of tampons over as wide a range of sizes as possible and, more generally, to improve the comfort and convenience in the use of such tampons.

It is known that the vagina is a tubular shaped resilient structure, which is subjected to a changing pressure by the organs surrounding it, so that the mucous membrane walls of the vagina will sometimes partly overlie each other, and when a tampon is used flow channels may remain between the latter and the walls of the body cavity, which detract from the comfort of the user. In order to overcome this difficulty tampons are often placed upon the market in various sizes, which, with increasing size, likewise have a correspondingly greater weight, whilst not, however, exhibiting an absorption capacity increasing proportionally with the weight, but having an inadequate capacity for expansion.

The known immersion method can be used for measuring the liquid absorption capacity of tampons, wherein a tampon is dipped in a measuring cylinder charged with a definite quantity of drinking water at about 20° C. in order that it may absorb a full charge of water. Thereafter the tampon is lifted out of the water and is held above the water level of the measuring cylinder until the fine jet of water running from the tampon is interrupted and the first droplet falls. The quantity of water now contained in the tampon may be determined by reading off from the measuring cylinder or by determining the difference between the wet and dry weight of the tampon.

For determining the radial expansion pressure of the tampon a measuring device can be used which consists of a flexible but inextensible measuring strip whose width corresponds to the length of the tampon under test. The strip is laid around a wooden cylinder with a given diameter and both ends are connected together by means of two closely adjacent rods and are taken to the measuring head of a measuring device. The measuring head operates upon the principle of static force measurement. The measuring strip embracing the wooden cylinder is prestressed to a definite value by means of a spindle above the measuring head of the measuring device. This position of the measuring head is marked by an adjusting ring. Thereafter the loop is released and the wooden cylinder removed.

Thereafter the tampon under test is inserted in the loop of the measuring strip and this is then tightened to such a degree until the measuring head of the measuring device has reached the position determined by the adjusting ring. Thereafter the tampon is moistened with liquid until the first drop falls off from the underside of the tampon. In absorbing the liquid the tampon exerts upon the measuring strip, which embraces its periphery, a radial expansion pressure which can be recorded by the measuring device by a stylus moving over graph paper. In this way the average tensile force upon the loop is determined from a series of individual experiments and the respective radial pressure is determined in mm. water gauge.

An object of the present invention is to provide a tampon which has an optimum capacity for radial expansion and wherein at the same time, independently of the weight of quantity of material used, there is afforded an optimum specific absorption capacity, that is the liquid absorption per gram of tampon material measured according to the above indicated method.

The tampon consisting of a cylindrically shaped body made of compressed absorbent material should, when in a wet medium, expand transversely to its long axis with such a pressure that it fills out the cross section of the vagina and even when a sudden increase occurs in the vaginal pressure upon the tampon, the latter should offer the greatest possible resistance to a change of volume or change in its cross section.

With the object of providing a solution to this problem, the tampon in accordance with the invention is characterised by the feature that when allowed to expand in a wet medium, in a shallow dish, there is present at least in the region of the introduction end of the tampon a specific wet length of about 0.5 to 1.7 cm. per gram of dry tampon material. Appropriately this specific wet length lies in the range of 0.8 to 1.4 cm. per gram of dry tampon material.

The invention is based upon the concept that with the achievement of an optimum radial capacity for expansion and specific absorption capacity, all of the further properties essential for the practical use of a catamenial tampon can be designed for the optimum effect. Thus the capability for liquid retention can be increased to such a degree that it can be equal to withstanding a counter-pressure corresponding to about 1.6 times to twice the radial expansion pressure. This means that the maximum degree of safety in the use of the tampon is achieved. A further substantial advantage of the invention lies in the fact that under a counterpressure of about 200 mm. water column the capacity for absorption of the tampon in accordance with the invention amounts to about 80 to 95% of the expansion volume with a liquid accommodation capacity of at least 24 ml.

The speed of absorption is dependent among other things upon the size of the contact surface of the tampon. Consequently the greater is the diameter assumed by the tampon under the expansion pressure, the greater is the absorption capacity of the tampon.

In a further development of the invention it is provided that a tampon will exhibit an increase in the radial expansion pressure from 167 to 4100 mm. water column with a diameter expanded to 25 mm. in a wet medium and with a decreasing specific wet length. Thus the greater is the radial expansion pressure, the greater is the liquid retaining capacity of the tampon in opposition to a pressure which the organs enclosing the vagina will exert upon the tampon. A limitation of the expanded tampon length to about 4 to 6 cm. will best suit the anatomical circumstances in so far as over a region corresponding to this length the vagina is of such smaller sensitivity that when using the tampon no unpleasant sensations are to be expected.

Under the assumption that the elastic tissues surrounding the vagina will exert a pressure of about 200 mm. water column upon the outer surface of the tampon, a further feature of the invention is based upon the fact that the tampon with decreasing specific wet length in a wet medium will expand to a diameter of 24 to 41 mm.

From the preceding statements it will be evident that by a reduction of the wet length to 0.5 cm. per gram of dry tampon material, the radial expansion pressure may be increased up to a definite optimum, which can vary widely in dependence upon the different physiological characteristics and requirements of the individual users. In order to take this into account it is recommended that for different tampon sizes there should be a different specific wet length per unit weight of tampon material.

A tampon having a specific wet length of 0.5 to 1.7 cm. or of 0.8 to 1.4 cm. per gram of dry tampon material may be produced in different ways. Nevertheless the fact appears to be important that a tampon which expands only in the radial direction will be the most effective because any extension of the tampon beyond its original length during use will lead to a reduction in the radial expansion pressure. The further features of the invention are therefore preferentially directed to such tampons which have a wound structure and wherein therefore the fleece is folded or wound upon itself before it assumes the final form by pressing.

In a tampon, which consists of a cut length of a fleece composed of random disposed fibres rolled or folded upon itself in the longitudinal direction and afterwards compressed radially in a press to the required final diameter of the rod shaped tampon, an optimum specific absorption capacity, namely the liquid absorption per gram of tampon material, may be achieved in accordance with the invention if, when using the immersion method, the tampon, independently of its weight, exhibits a maximum specific absorption capacity at a specific volume of at least 12 cm.$^3$ per gram of tampon material with a ratio of between 0.5 to 1.0 of the diameter to the length of the uncompressed roll.

In this connection the invention is characterised by a substantially direct proportional variation of the ratio of the specific absorption capacity to the specific volume of the tampon material. Preferably the tampon in accordance with the invention exhibits, independently of its weight, a maximum and substantially linear, specific absorption capacity of about 15 to 30 ml. of water per gram of tampon material with a specific volume of about 12 to 50 cm.$^3$ per gram of tampon material. A particularly advantageous practical form of the tampon in accordance with the invention is achieved by a maximum and, substantially linear, absorption capacity of about 14.5 to 18.0 ml. of water per gram of tampon material and a specific volume of about 15 to 20 cm.$^3$ per gram of tampon material.

A further important feature of the invention consists in that whilst maintaining a constant length of the tampon the specific volume of the uncompressed roll is dependent substantially upon the magnitude of the roll diameter. This provides a means of varying the specific volume of the roll.

In the case where the tampon is composed of a calendered fleece, which, before being radially compressed to the final form of the tampon, is rolled up by means of a fork-shaped rotary mandrel, a preferred further feature of the invention further provides that, with a given weight of the tampon and a given thickness of the fibre fleece, the specific volume of the uncompressed roll is dependent upon the diameter of the winding mandrel.

An advantageous practical form of the tampon in accordance with the invention may be realised by operating with a winding mandrel having a diameter of about 12 to 24 mm. to form the tampon from a wadding fleece of about 100 to 400 mm. length to give a roll of a diameter of 20 to 60 mm. A diameter of the roll of about 28 to 45 mm. has been shown to be satisfactory with a fleece length of about 250 mm. It has been shown that the temporary hollow spaces in the uncompressed roll, which are due to the use of the slotted winding mandrel, can be neglected when determining the specific volume of the roll, and this is because a calendered length of fleece, even after being rolled up upon a mandrel of, preferably, up to 24 mm. diameter, still possesses sufficient inherent resilience to close up the hollow space and thereafter to increase the specific volume of the roll in a moisture-bearing medium.

According to a further aspect of the invention the tampon may also consist of an uncalendered fleece. In this case a further feature of the invention is directed to the fact that, when using the fork-shaped winding mandrel for winding up an uncalendered fleece, if the fibre fleece has a given weight and a given thickness, the magnitude of the diameter of the uncompressed roll is independent of the diameter of the winding mandrel. In this case the fork-shaped winding mandrel is preferably formed of two needles. In this case after withdrawing the winding mandrel no hollow spaces will appear in the roll, which are, in general only incompletely filled out by the fibres of the uncalendered fleece.

In order that the tampon in accordance with the invention shall have, in addition to the optimum absorption capacity and the optimum expansion pressure, a speed of absorption which is as high as possible, which, in fact, is highly desirable in the practical use of catamenial tampons, it is proposed, in accordance with a further aspect of the invention, to arrange absorption zones with the specific volume of about 2.5 to 25.0 cm.$^3$ per gram of tampon material to alternate in the longitudinal direction of the tampon with expansion zones exhibiting the specific we length of about 0.5 to 1.7 cm. per gram of tampon material, as hereinbefore defined.

The specific volume of the absorption zones in the tampon is preferably selected to be in a range of 6.5 to 20 cm.$^3$ per gram of tampon material whilst in the expansion zones the wet length is in the region of 0.8 to 1.4 per gram of tampon material. Because the speed of absorption varies proportionally to the surface area which is in contact with the liquid which is being absorbed, there is a special advantage in designing the tampon so that the introduction end of the tampon is an expansion zone because this creates in a comparatively short time an absorbent surface of the maximum size and at the same time prevents the emergence of secretions from the body cavity. In such a construction the expansion zones and the absorption zones can be designed of laminated form. Although, naturally, when the expansion zones are directed at right-angles to the longitudinal axis of the tampon, the radial expansion pressure exerts itself most effectively, it is also conceivable to have structural forms of the tampon, wherein the expansion zones and absorption zones enclose an angle with the longitudinal axis of the tampon.

When using a tampon, whose fleece is of absorbent material which is rolled up upon itself substantially normal to the longitudinal axis of the tampon, it is proposed according to a further feature of the invention that the fleece is provided with zones of greater and lesser material concentration distributed over its width and/or its length. Preferably, these strip-like concentrations of the material should extend in the longitudinal direction of the fleece web. In this case the constructional design of the tampon may be such that longitudinal pieces of absorbent material are provided which are distributed over the width and/or the length of the fleece web of absorbent material. In some circumstances it is proposed that the fleece web and the additional lengths of material applied thereto be selected of different absorbent materials. In this manner the tampon is given a high expansion capacity and absorbent capacity with a desirably low amount of added material.

According to a future advantageous feature of the invention tufts of fibre are arranged to penetrate the tampon at least partially. In this case the tufts of fibre extend appropriately substantially transversely through the tampon. Some of the fibre tufts, or even only one thereof, may be arranged advantageously substantially coaxially or parallel to the longitudinal axis of the tampon so as to extend from the introduction end into the interior of the tampon, whereby the tampon will have the optimum speed of absorption after its introduction into the body cavity. In this respect it is of particular advantage to have a tampon wherein those regions of the tampon provided with the fibre tufts have a specific volume of about 2.5 to 25.0 cm.$^3$ per gram of tampon material, whilst the fibre tufts are arranged in holes which are provided in the finished compressed tampon. In this way the result is achieved that the liquid is absorbed very rapidly into the interior of the tampon and the absorption capacity of the tampon is fully utilised in the shortest possible time.

Appropriately a tampon according to the invention has a length of about 40 to 60 mm. The tampon can consist of cellulose wool fibres, with which is admixed, if necessary, up to 70% of cotton fibres. Advantageously the introduction end of the tampon is rounded off.

The invention will now be described below with reference to the results of experiments.

TABLE I

| Expansion diameter D (mm.) | Specific wet length (cm./g.) | | | |
|---|---|---|---|---|
| | 1.3 G/D$^2$ (g./cm.$^2$) | Radial pressure (mm. water col.) | 1.16 G/D$^2$ (g./cm.$^2$) | Radial pressure (mm. water col.) |
| 18 | 1.172 | 1,603 | | |
| 20 | 0.950 | 834 | 1.075 | 1,222 |
| 22 | 0.785 | 459 | 0.888 | 673 |
| 24 | 0.660 | 265 | 0.746 | 388 |
| 26 | 0.562 | 160 | 0.636 | 234 |
| 28 | | | 0.549 | 149 |

Table 1 shows the dependence of the radial expansion pressure upon the specific wet length and the expansion diameter. The tampon material consists in this case of a mixture of cotton and cellulose wool. The tabled values represent the mean values resulting from experiments on a total of 1000 tampons. It is evident that with progressively decreasing wet length per gram of dry tampon material, as well as with smaller expansion diameters, the radial expansion pressure rises steeply.

It was found that the radial expansion pressure of the tampon is a definite exponential function of the ratio of the reciprocal value of the specific wet length per gram of dry tampon material to the square of the expansion diameter. If, therefore, a specific wet length of tampon material is fixed, then the expansion diameter may be determined in dependence upon the particular radial expansion pressure and the corresponding counter pressure. Likewise, with a definite expansion diameter, the radial expansion pressure is dependent upon the specific wet length per gram of dry tampon material.

TABLE 2

| Radial expansion pressure (mm. water col.) | Retentive capacity (mm. water col.) |
|---|---|
| 2,900 | 4,830 |
| 1,410 | 2,380 |
| 620 | 1,000 |
| 290 | 586 |
| 167 | 315 |

From a comparison of the values stated in Table 2 for the respective radial expansion pressures and the retentive capacity of the tampon it is evident that with increasing radial expansion pressure, the retentive capacity of the tampon also increases. The pressure which is necessary in order to express one drop of liquid from the fully saturated tampon amounts to 1.6 times to 2.0 times, an on an average 1.8 times, the respective radial expansion pressure.

TABLE 3

| Effective surface (cm.$^2$) | Specific wet length (cm./g.) | Absorption speed (ml./min.) |
|---|---|---|
| 1.61 | 1.85 | 5.94 |
| 2.54 | 1.17 | 7.41 |

Table 3 shows that, given the condition of the same porosity of the material of the tampons being compared, a smaller specific wet length corresponds to a greater liquid contact surface and therefore a higher speed of absorption, whilst the absorption speed for the active surface of the tampon which for the time being is exposed to the liquid lies in an optimum range.

TABLE 4

[Radial expansion pressure 200 mm. (water col).; constant tampon length of 5 cm.]

| Specific wet length (cm./g.) | Expansion volume (ccm.) | Absorption capacity (ml.) |
|---|---|---|
| 1.105 | 29.6 | 23.81 |
| 1.0 | 32.7 | 28.0 |
| 0.81 | 40.6 | 34.6 |

The figures seen in Table 4 for the expansion volume have been derived in dependence upon the specific wet length with a radial expansion pressure of 200 mm. water column. It is evident that with decreasing specific wet length both the expansion volume as well as the absorption capacity increase. The comparison of the expansion volume with the coresponding values of the absorption capacity shows that the absorption capacity for the tampon is utilised up to 80 to 95% of the volume of the tampon in the expanded condition and therefore likewise lies in an optimum region.

Below there are given in Table 5 the results of a series of experiments conducted with the immersion method, in which the stated figures are mean values resulting from experiments with forty tampons in each case.

TABLE 5.—VALUES DETERMINED BY THE METHOD OF IMMERSION

| No. | Specific volume (cm.$^3$/g.) | Specific absorption capacity (ml./g.) | Total quantity of absorbed liquid (ml.) | Weight (g.) | Roll after winding $\phi$ (mm.) | Winding mandrel $\phi$ (mm.) |
|---|---|---|---|---|---|---|
| 1 | 10.0 | 10.40 | 29.0 | 2.78 | 27.2 | 13 |
| 2 | 11.6 | 12.30 | 46.20 | 3.75 | 34.0 | 17 |
| 3 | 12.38 | 13.57 | 50.6 | 3.73 | 35.0 | 20 |
| 4 | 16.0 | 16.50 | 28.3 | 1.7 | 27.0 | 13 |
| 5 | 16.25 | 17.80 | 32.2 | 1.8 | 28.0 | 13 |
| 6 | 16.6 | 18.70 | 43.0 | 2.3 | 31.8 | 15 |
| 7 | 17.0 | 18.45 | 48.7 | 2.64 | 34.5 | 17 |
| 8 | 17.25 | 18.78 | 48.8 | 2.6 | 34.5 | 17 |
| 9 | 17.88 | 18.80 | 47.2 | 2.51 | 34.5 | 20 |
| 10 | 18.25 | 19.00 | 48.0 | 2.53 | 35.0 | 17 |
| 11 | 19.9 | 21.40 | 39.0 | 1.82 | 31.0 | 13 |
| 12 | 24.5 | 23.33 | 40.18 | 1.72 | 35.5 | 20 |

The tampons which were used as a basis for these experiments were made from pieces cut off from fleece webs which had been calendered to different degrees, consisting of a mixture of cotton wool and cellulose wool in the ratio of 70% cotton wool to 30% cellulose wool. The cut off sections of the fleece web had a length of about 250 mm. and a width of about 50 mm. whilst the cellulose wool was composed of fibres with a length of 20 to 40 mm.

These cut off lengths of the fleece web were wound up about a slotted or forked winding mandrel. From this operation there resulted a substantially cylindrical roll whose length corresponded to the width of 50 mm. of the fleece.

The differing diameters of the roll as stated in column 5 of the table result partly from the use of winding mandrels of various diameters, which can be seen from column 6. In addition to the possibility of using winding mandrels of various diameters, it is possible to vary the diameter of the roll by the use of fleece which is calendered to various thicknesses. From this it has been demonstrated that the hollow space remaining after extraction of the winding mandrel will be filled out, in the case of a roll consisting of a calendered fleece, by virtue of the inherent resilience of the fibres of the roll when in a moisture-bearing medium.

Various quantities of material can be employed for the wadding fleece. Finally it is also conceivable to use combinations of all those methods which have been taken into account in the experiments.

The volume of the substantially cylindrical roll can accordingly be calculated in accordance with column 5 from the constant length about 50 mm. used in the experiments and the respective diameter of the roll, whilst the free space which results from the removal of the winding mandrel, can be neglected.

From the ratio between the total volume of each roll to the weight of the contained quantity of material there is produced the specific volume of the roll, i.e. that volume which is taken up by 1 gram of the wound material. In this case it is not only the volume of the fibres themselves which is taken into account but also the spaces existing between these fibres. Consequently the greater is the spacing between the individual fibres the greater is the volume which is taken up by 1 gram of the wound material. The values for the specific volumes resulting from the quantities of material used taking into account column 4 of the table are given in column 1.

The wound rolls having the volumes according to column 1 of the table were tested for their absorption capacity when in the uncompressed condition according to the above described immersion method, from which resulted the values given respectively in columns 2 and 3 of the table. In column 2 of the table there are found the respective values for the specific absorption capacity, that is to say the stated values relate to that quantity of water which is taken up by 1 gram of the wound material.

A comparison of the values listed in columns 1 and 2 of Table 5 for the specific volume and the specific absorption capacity lead to the conclusion that, corresponding to the variation of the specific volume, there is obtained a substantially linear, or directly proportional, variation of the specific absorption capacity of the roll. Furthermore it was found that this substantially direct proportionality between the specific volume and the absorption capacity was also achieved in those rolls, which, after being wound, were compressed concentrically to the longitudinal axis to the final form of the tampon, even though the absorption capacity in this case was reduced by a factor 1.126, i.e. by about 11%.

From this direct relationship between the specific volume and the specific absorption capacity on the one hand and secondly from the dependence of the specific volume upon the roll diameter on the other hand, there is derived the conclusion that by varying the roll diameter the specific volume, and therefore the absorption capacity, of a tampon can be determined.

From a comparison of the values given for tests Nos. 4 and 12 in Table 5 it may be concluded, for example, that taking the equal thickness of the fleece used in both of the tests and equal weight of the starting material, a marked change of the roll diameter may be achieved by using a winding mandrel of 13 mm. and 20 mm. respectively. This marked change of the roll diameter corresponds to a material change in the specific volume and therefore a corresponding increase in the absorption capacity of the wound roll.

The result is otherwise from a comparison of the series of experiments 3 and 10 according to Table 5, wherein the test series 3 was carried out with a fleece of normal thickness and test No. 10 was carried out with a fleece having a less degree of calendering, i.e. a great thickness, so that, notwithstanding the use of a winding mandrel in test No. 3 having a larger diameter as compared with that in test No. 10, both of the wound rolls exhibit the same diameter. However, notwithstanding the same diameter of the roll in both tests, the substantially lower value for the specific volume and the absorption capacity in test No. 3 is striking. This is the case, although in test No. 3 a greater quantity of material was involved than in test No. 10. Because, however, referred to the specific volume and the specific absorption capacity, a higher weight of material has a reducing influence, whilst the increase in the roll diameter has the result of increasing the specific volume and the specific absorption capacity, this explains the marked increase, as contrasted with test No. 3, in the specific values for the volume and the absorption capacity of the roll.

It has been determined that the direct relationship between the specific volume and the specific absorption capacity holds substantially for the case where the rolls in the uncompressed condition have a diameter which is equal to their length. Because the length of the tampon, fixed by its purpose of use, should amount to about 40 to 60 mm., it was found that the ratio of the diameter of the roll to its length may be varied at a maximum within a region of 0.5 to 1.0. The differences occurring within this measurement range of the length to the diameter of the roll are negligibly small. The values appearing in the table lie wholly within the stated variation range. It is accordingly permissible, for a given value of the specific volume, to specify in advance a constant value for the specific absorption capacity and to take these values as a basis for the design of tampons of different weights in the sense that with a minimum expenditure of material an optimum absorption capacity is achieved.

Thus for example, taking as a basis a volume of material in the roll as 16 cm.$^3$/g., a corresponding specific absorption capacity of 15 ml./g. of the rolled material and a constant wound length of 50 mm., the following data result:

| Tampon weight (g.) | Necessary roll diameter (mm.) | Expected absorption capacity (ml.) |
|---|---|---|
| 2.0 | 28.6 | 30.0 |
| 3.0 | 35.1 | 45.0 |
| 4.0 | 40.4 | 60.0 |

The winding mandrel which is used has in this case a diameter of 17 mm.

Figure 2:
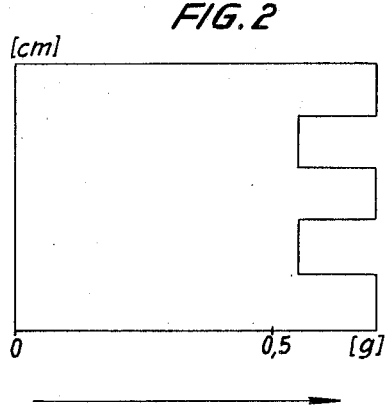
Figure 3:
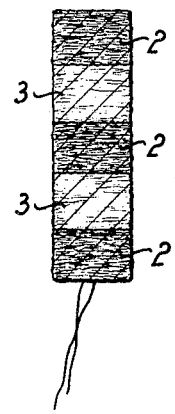
Figure 4:
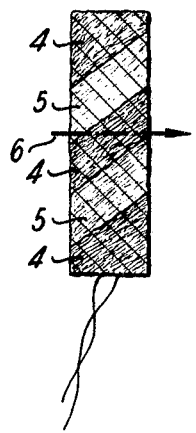
Figure 5:
Figure 6:
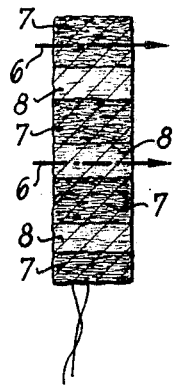
Figure 7:
Figure 8:
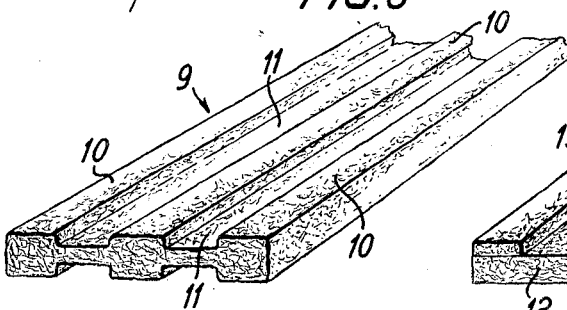
Figure 9:
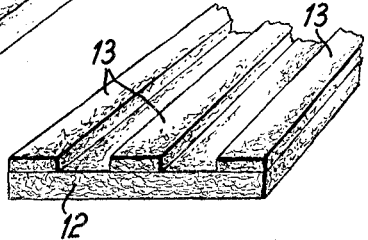

Preferred embodiments of tampons constructed in accordance with the invention will now be described with reference to the accompanying diagrammatic drawings wherein:

FIGURE 1 is an elevation of the tampon according to the invention,

FIGURE 2 is a diagram in which the weight of the tampon is plotted over the length or height of the tampon, FIGURE 3 is a longitudinal section of the tampon according to FIGURE 1 with the expansion zones 2 and the absorption zones 3 alternating in the longitudinal direction, FIGURE 4 is another embodiment of a tampon with absorption and expansion zones which include an angle with the longitudinal axis of the tampon and in which a tuft of fibres is drawn transversely into the tampon, FIGURE 5 is an end view according to FIGURES 1, 3 and 4, in which the winding structure of the tampon material is visible, FIGURE 6 is a tampon through which are transversely drawn several tufts of fibres, FIGURE 7 is a cross-section through the tampon according to FIGURE 6 with a tuft of fibres extending transversely through the tampon, FIGURE 8 shows a length of starting material for the tampon according to the FIGURES 1, 2 and 3, with zones having greater and smaller concentrations of material distributed over the length of the fleece, FIGURE 9 is another embodiment of a fleece on which are arranged longitudinal sections of absorbent material spaced at intervals from each other, FIGURE 10 is a graph indicating rate of absorption against density.

In FIGURE 1 the reference numeral 1 indicates the tampon, which, in accordance with the longitudinal section according to FIGURE 3, has an expansion zone 2 at each end and in the middle, between which are arranged absorption zones 3. In accordance with FIGURE 3 the expansion zones 2 and the absorption zones 3 form layers which run substantially at right angles to the longitudinal axis of the tampon.

The specific volume of the absorption zone lies in the range of approximately 2.5 to 25 cm.$^3$ per g. of tampon material, whilst the expansion zones have a specific wet length of approximately 0.5 to 1.7 cm./g. of dry tampon material, when expanded in a wet environment. It is preferable to provide a specific volume of approximately 6.5 to 20 cm.$^3$ per g. of tampon material for the absorption zones, and a specific wet length of 0.8 to 1.4 cm./g. of tampon material for the expansion zones.

In accordance with the embodiment in FIGURE 4 expansion zones 4 are similarly provided on the two end faces and in the centre of the tampon, between which lie the absorption zones 5. In contrast to the embodiment according to FIGURE 3 the expansion zones 4 and the absorption zones 5 are inclined at an angle to the longitudinal axis of the tampon. A tuft of fibres, the position of which is indicated by an arrow 6, is, in accordance with FIGURE 4, drawn through the tampon transversely to its longitudinal axis. In this manner the penetration of body-secretions into the inside of the tampon is accelerated, which assists the expansion of the tampon after insertion into the body cavity.

The tampon according to FIGURE 6 consists of four expansion zones 7, and three interpositioned absorption zones 8. The expansion and absorption zones 7, 8 are here again in the form of layers which lie at right angles to the longitudinal axis of the tampon. The expansion zone 7 at the insertion end of the tampon and the centre absorption zone 8 have respectively a tuft of fibres 6 drawn through them, which thus speedily absorbs into the tampon possible secretions flowing on the wall of the body cavity along the length of the tampon, and thereby prevents leakage. In the cross-section according to FIGURE 7 through the tampon according to FIGURE 6 the tuft of fibres is clearly shown extending transversely through the absorption zone 8 of the tampon.

The rolled structure of the tampon may be seen in FIGURE 5, which comprises a fleece of absorbent material wrapped or rolled upon itself approximately at right angles to the longitudinal axis of the tampon. The expansion zones 2, 4, 7, or the absorption zones 3, 5, 8, may be obtained by distributing greater and smaller concentrations of material in zones over the breadth and/or the length of a fleece-strip.

In accordance with FIGURE 8 a fleece-strip 9 of absorbent material has longitudinal sections 10 of greater material concentration arranged distributed over its width. In the present case there are three longitudinal sections 10 between which are provided two longitudinal sections 11 of smaller material concentration. When such a fleece was rolled up a tampon in accordance with FIGURE 3 would be produced.

It is, however, also possible to make such a tampon by using a fleece strip 12 of a uniform surface structure in accordance with FIGURE 9, on which are placed three longitudinal sections 13 over the width thereof spaced parallel to each other. These longitudinal sections may consist of the same absorbent material as the fleece-strip 12, or may consist of another absorbent material.

FIGURE 2 shows the weight distribution of the material over the length of the tampon.

An experiment to determine the rate of absorption in relation to density of tampon material may be performed as follows.

Into a Plexiglas tube carded lengths of fleece were drawn in such a number as to result in a precisely definable concentration and the mass of fibres was directed in the longitudinal direction from the tube. This tube was now immersed vertically for several millimetres in the liquid. The increase in weight caused by the absorption of the liquid was measured by a static force measuring device. This increase in weight due to the rising liquid (per unit time) was recorded with a recording device. In order to limit the influence of the falling level of the liquid in the vessel, a vessel was chosen having the largest possible cross section.

TABLE 6

| $\sqrt{t}$ (min. ½) | Absorbed quantity of blood in cm.$^3$ for a density of dry tampon material of— | | | |
|---|---|---|---|---|
|  | 0.067 (g./cm.$^3$) | 0.13 (g./cm.$^3$) | 0.199 (g./cm.$^3$) | 0.268 (g./cm.$^3$) |
| 0 | 0 | 0 | 0 | 0 |
| 0.5 | 4.5 | 5.1 | 3.0 | 1.9 |
| 1.0 | 6.9 | 8.3 | 6.1 | 3.9 |
| 1.5 | 8.3 | 10.8 | 8.8 | 5.8 |
| 2.0 | 9.2 |  | 10.9 | 7.7 |
| 2.5 | 9.8 |  |  | 9.5 |

Table 6 shows a set of results obtained by this method.

If in this case the absorbed quantity of blood is plotted in cm.$^3$ against the square root of the time, then the following may be infeared from the graph shown in FIG. 10.

The absorption speed is the greatest with a fibre concentration of 0.13 g./cm.$^3$. With a higher density the absorption level is greater and the speed lower. The gravitational attraction retards the absorption speed in the case of lower densities. The absorption speed in the horizontal direction is represented by the initial speed which may be determined by the tangent at the point 0. For the optimum absorption speed the optimum density lies somewhere in the region of 0.05 g./cm.$^3$ to 0.15 g./cm.$^3$.

Although the invention has been described in the foregoing description with reference to a tampon composed of a cotton and a cellulose wool mixture, it is obviously conceivable that porous synthetic plastics material can be employed as the absorbent material. Furthermore, the tampon may, if necessary, be composed of other different materials, for example of a rolled cotton fleece with cellulose insertions or additions, or it may consist of a combination of synthetic plastics materials with natural or synthetic fibre materials, whilst the whole may be enclosed in a knitted or stretched tissue net.

What we claim is:

1. A catamenial tampon comprising a substantially cylindical fiber-form object made up of a fleece of substantially randomly disposed fibers having a specific wet length, at least at the leading end thereof, of about 0.5 to 1.7 centimeters per gram, which specific wet length is measured by allowing said tampon to expand in a liquid medium in a shallow dish, which fleece is coiled upon itself in a direction normal to the longitudinal axis of said tampon, and which tampon contains zones of greater and lesser material concentration distributed at least over the width thereof.

2. A tampon according to claim 1, wherein the specific wet length amounts to 0.8 to 1.4 cm. per gram of tampon material.

3. A tampon according to claim 1, wherein at least over some portions of its length the tampon exerts a radial expansion pressure of 167 to 4100 mm. water column when these portions expand to about 25 mm. diameter in a wet medium with a reduction in the specific wet length.

4. A tampon according to claim 1, wherein under the influence of an opposing pressure of about 200 mm. water column on the peripheral surface of the tampon the latter expands to a diameter of about 24 to 41 mm. in a wet medium with a reduction in the specific wet length.

5. A tampon according to claim 1, consisting of a cut length of a fleece composed of random disposed fibres which is rolled or folded upon itself in the longitudinal direction and subsequently compressed radially in a press to the diameter required to form a rod-like body, wherein when subjected to the immersion method the tampon exhibits independently of its weight a maximum specific absorption capacity for a specific volume of at least 12 cm.$^3$ per gram of tampon material with a ratio of between 0.5 to 1.0 of the diameter to the length of the uncompressed roll.

6. A tampon according to claim 5, wherein there is obtained a substantially directly proportional variation of the ratio of the specific absorption capacity to the specific volume of the tampon material.

7. A tampon according to claim 5, wherein independently of its weight the tampon exhibits a maximum and substantially linear specific absorption capacity of about 15 to 30 ml. of water per gram of tampon material for a specific volume of about 12 to 50 cm.$^3$ per gram of tampon material.

8. A tampon according to claim 7, wherein the maximum and substantially linear absorption capacity amounts to about 14.5 to 18.0 ml. of water per gram of tampon material for a specific volume of about 15 to 20 cm.$^3$ per gram of tampon material.

9. A tampon according to claim 5, comprising a calendered fleece which is wound upon a fork-shaped rotary mandrel before the radial compression to the final form of the tampon, wherein, with a given weight of the tampon and a given thickness of the fibre fleece, the specific volume of the uncompressed roll is dependent upon the diameter of the winding mandrel.

10. A tampon according to claim 5, wherein the hollow space formed by the fork-shaped winding mandrel after withdrawal thereof is filled out by the fibres of the calendered fleece by reason of the inherent resilience of the fibres of the fibres in a wet medium.

11. A tampon according to claim 5, wherein by using a fork-shaped winding mandrel having a diameter of about 12 to 24 mm., the tampon is made from a wadding fleece of about 100 to 400 mm. length to form a roll having a diameter of 20 to 60 mm.

12. A tampon according to claim 11, wherein the roll diameter is within the range of 28 to 45 mm. and the wadding fleece is about 250 mm. long.

13. A tampon according to claim 12, wherein there is employed a fork-shaped winding mandrel preferably designed in the shape of a neddle for the purpose of winding up the uncalendered fleece, and wherein with a given weight and given thickness of the fibrous fleece the magnitude of the diameter of the uncompressed roll is independent of the diameter of the fork-shaped winding mandrel.

14. A tampon according to claim 1, wherein with a substantially constant length of the tampon the specific volume of the non-compressed roll is dependent substantially upon the magnitude of the roll diameter.

15. A tampon according to claim 1, wherein absorption zones with a specific volume of about 2.5 to 25 cm.$^3$ per gram of tampon material alternate in the longitudinal direction of the tampon with expansion zones exhibiting the specific wet length of about 0.5 to 1.7 cm. per gram of tampon material.

16. A tampon as claimed in claim 1, wherein said zones are distributed over the width and the length of said tampon.

17. A tampon according to claim 1, wherein upon the fleece web of absorbent material there are arranged cut lengths of absorbent material distributed over the width of the web.

18. A tampon according to claim 1, wherein the fleece web and the additional lengths of material applied thereto consist of material having differing absorption capacities.

19. A tampon according to claim 18, wherein tufts of fibre are arranged to penetrate the tampon at least partially.

20. A tampon according to claim 19, wherein at those regions of the tampon which are provided with the tufts of fibre, the tampon material exhibits a specific volume of about 2.5 to 25.0 cm.$^3$ per gram of tampon material, whilst the tufts of fibre are arranged in holes which are provided in the finished compressed tampon.

21. A tampon according to claim 20, wherein the tufts of fibre extend substantially transversely of the tampon.

22. A tampon according to claim 1, having a length of about 40 to 60 mm.

23. A tampon as claimed in claim 22, composed of a rolled fiber fleece containing additional portions of a cellulose fiber.

24. A tampon as claimed in claim 1, wherein the fiber content thereof consists of cellulose wool fibers admixed with up to about 70% cotton fibers.

25. A tampon as claimed in claim 1, wherein said tampon comprises a combination of synthetic plastic material and fiber material.

26. A tampon as claimed in claim 25, wherein said fibers are synthetic.

27. A tampon as claimed in claim 1, consisting essentially of porous synthetic plastic material.

28. A tampon according to claim 1, wherein the leading end is rounded.

29. A tampon according to claim 27, enclosed in a knitted or stretched tissue net.

30. A catamenial tampon comprising a substantially cylindrical fiber-form object made up of substantially randomly disposed fibers which object is made up of longitudinal direction laminated alternate expansion zones and absorption zones which absorption zones have a specific volume of about 6.5 to 20 cm.$^3$ per gram of tampon material and which expansion zones have a specific wet length of 0.8 to 1.4 cm. per gram of tampon material, measured by allowing said tampon to expand in a liquid medium in a shallow dish.

31. A tampon according to claim 30, wherein the expansion zones and the absorption zones include an angle with the longitudinal axis of the tampon.

References Cited

UNITED STATES PATENTS

| | | | |
|---|---|---|---|
| 2,355,628 | 8/1944 | Calhoun. | |
| 2,566,190 | 8/1951 | Greiner et al. | |
| 2,710,007 | 6/1955 | Greiner et al. | |
| 2,761,449 | 9/1956 | Bletzinger | 128—285 |
| 2,926,394 | 3/1960 | Bletzringer et al. | 128—285 |
| 2,926,667 | 3/1960 | Burger et al. | 128—285 |
| 3,011,495 | 12/1961 | Brecht. | |
| 3,068,867 | 12/1962 | Bletzringer et al. | |
| 3,291,130 | 12/1966 | Whitehead | 128—285 |
| 3,347,237 | 10/1967 | Jones | 128—285 |

FOREIGN PATENTS 877,473    12/1942    France.

CHARLES F. ROSENBAUM, Primary Examiner